United States Patent [19]
Silber et al.

[11] Patent Number: 5,159,839
[45] Date of Patent: Nov. 3, 1992

[54] APPARATUS FOR GAUGING HIGH PRESSURE GAS, IN PARTICULAR THE SUPPLY OF OXYGEN GAS ON BOARD AN AIRCRAFT

[75] Inventors: Gérard Silber, Chilly; Gilles Renner, Palaiseau, both of France

[73] Assignee: Societe de Fabricaiton d'Instruments de Mesure, Massy, France

[21] Appl. No.: 534,093

[22] Filed: Jun. 5, 1990

[51] Int. Cl.⁵ .............................................. G01L 9/00
[52] U.S. Cl. ...................................... 73/714; 73/756
[58] Field of Search .................... 73/756, 714, 708; 222/3; 374/143; 137/93

[56] References Cited

U.S. PATENT DOCUMENTS

| | | | |
|---|---|---|---|
| 2,547,458 | 4/1951 | Goodner | 222/3 |
| 3,556,098 | 1/1971 | Kanwisher et al. | 137/93 |
| 4,165,738 | 8/1979 | Graves et al. | 222/1 |
| 4,646,940 | 3/1987 | Kramer et al. | 222/1 |
| 4,876,903 | 10/1989 | Budinger | 73/865.1 |

FOREIGN PATENT DOCUMENTS

| | | |
|---|---|---|
| 3609701 | 9/1987 | Fed. Rep. of Germany. |
| 0093275 | 9/1983 | France. |
| 2629913 | 4/1988 | France. |

*Primary Examiner*—Donald D. Woodiel
*Attorney, Agent, or Firm*—Skjerven, Morrill, MacPherson, Franklin & Friel

[57] ABSTRACT

Apparatus for gauging high pressure gas in particular for the supply of oxygen gas on board on aircraft, the apparatus being associated with a gas tank or with a plurality of gas tanks having their outlets interconnected, the apparatus being wherein each individual tank is provided both with a pressure regulator connected to a common outlet duct, and with a pressure sensor producing a signal proportional to the pressure in the, or each, tank, with the or each, pressure sensor being connected to a calculation and storage unit suitable for determining the content of each individual tank on the basis of the signal associated therewith and taking account of the coefficient of compressibility of the gas contained in each individual tank on the basis of data stored in the storage unit for different values of pressure, and consequently deducing the overall available content, the calculation unit further including a readout for displaying the overall available content.

14 Claims, 1 Drawing Sheet

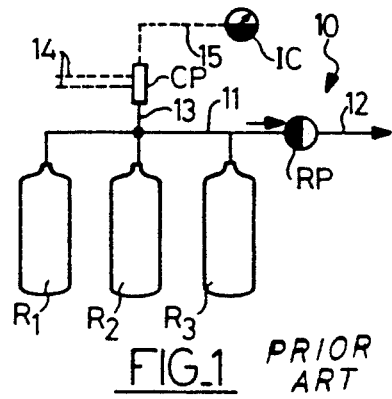
FIG_1 PRIOR ART
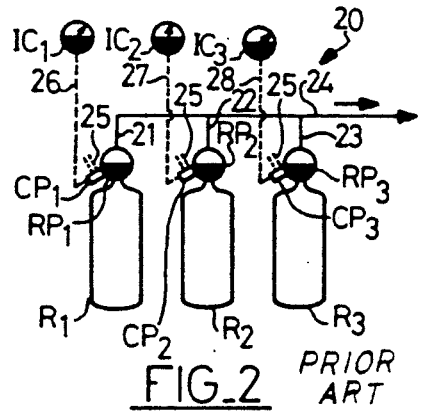
FIG_2 PRIOR ART
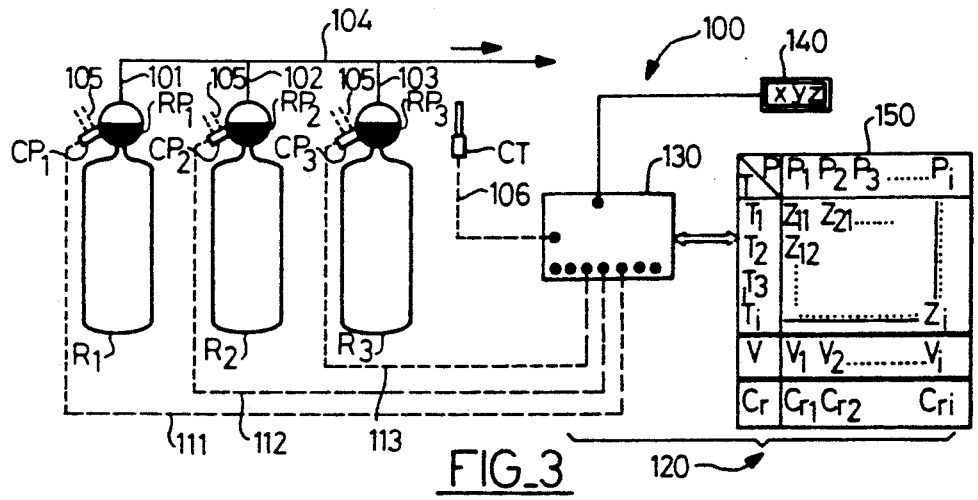
FIG_3
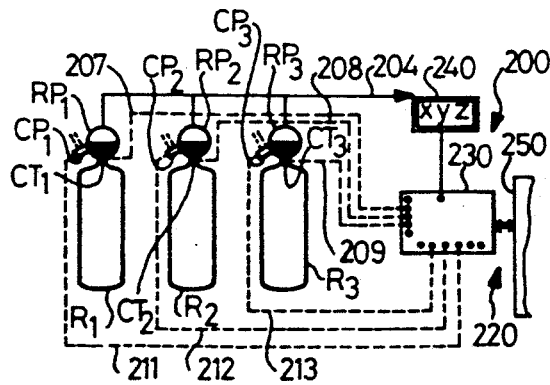
FIG_4
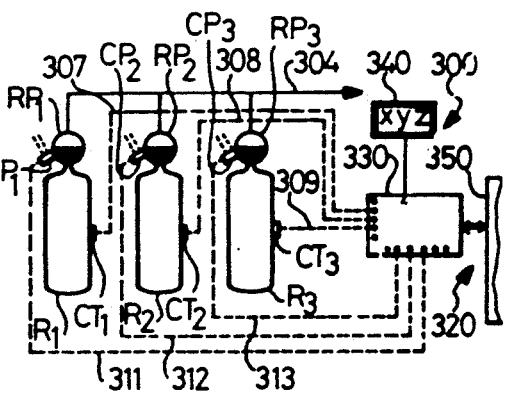
FIG_5

APPARATUS FOR GAUGING HIGH PRESSURE GAS, IN PARTICULAR THE SUPPLY OF OXYGEN GAS ON BOARD AN AIRCRAFT

The invention relates to gauging a high pressure gas, and more particularly, but not exclusively, to gauging the content of oxygen gas in tanks on board an aircraft.

BACKGROUND OF THE INVENTION

The term "gauging" is commonly used in the art to designate determining the quantity or content of gas available in the tank, said content being expressed in units of mass, or in certain applications more commonly in liters.

When expressed in liters, the conventional unit is liters NTPD for "Normal Temperature and Pressure, Dry", i.e. the volume the gas would occupy if dry and under standard conditions of temperature and pressure.

In some applications, it is difficult to gauge a high pressure gas contained in tanks accurately because of variations in various parameters that are involved in determining the content of the tank. This problem is made even more complicated in the special case of a supply of oxygen gas on board an aircraft since it is necessary to satisfy safety requirements for which the presence of a high pressure circuit is a cause of particular concern.

It is conventional to fit a high pressure gas tank, in particular a tank of oxygen gas, with a pressure regulator, sometimes also caused an expander, whose function is to regulate the outlet pressure to a stabilized low value, e.g. 0.5 MPa, regardless of the outlet flow rate.

When it is desired to determine the content of the tank, it is common practice to mount a pressure sensor on such a pressure regulator. Such a sensor is powered electrically and delivers a signal proportional to the pressure of the gas in the tank. Sensors used for this purpose include membrane sensors, beam deflection sensors, strain gauge sensors, and piezo-resistive sensors.

Such a pressure sensor is generally associated with a digital readout or with an analog readout using a pointer, with the readout being graduated directly in pressure units, or as a percentage of tank pressure, which corresponds substantially to the percentage to which the tank is full.

This gives an idea of the gas content of the tank, assuming that the other parameters involved in determining said content are constant, which parameters include, in particular, the temperature and the coefficient of compressibility of the gas.

Thus, the measurement performed takes account of gas pressure only, and takes no account of gas temperature T or of its coefficient of compressibility z: as a result the measurement is relatively imprecise.

In the particular case of a supply of oxygen gas on board an aircraft, the variations in these two parameters T and z are large (T varies between 258° K. to 328° K., and z varies between about 1 and 0.9), such that measurement inaccuracy is further increased, and it may be estimated that the relative error can be as much as 25% for a given tank (where the mass m of gas is given by the equation $m = PV/zrT$, where P is pressure, V is volume, z is the coefficient compressibility, r is a constant for the gas in question, and T is temperature).

The above problem is naturally applicable to the case where a plurality of high pressure gas tanks have their outlets interconnected, as is the case in particular for oxygen tanks on board aircraft.

Two types of circuit are conventionally used with a plurality of tanks.

One conventional system design has a common high pressure duct to which the outlets of all of the tanks are connected, the duct leading firstly to a pressure regulator having a low pressure utilization circuit connected downstream therefrom, and secondly to a single sensor which delivers a signal proportional to the pressure in the common duct.

This thus serves to measure pressure and the corresponding signal is transmitted to a readout graduated in terms of pressure or in terms of percentage full, or even in terms of liters NTPD content, as mentioned above.

In some cases, the sensor-readout assembly is replaced by a mere pressure gauge which, while simplifying the structure, nevertheless further increases the inaccuracy of the measurement performed.

Such a design suffers from numerous drawbacks.

Firstly, when the tanks contain oxygen gas, the presence of a circuit containing oxygen gas at high pressure represents a danger due to the risk of spontaneous ignition (in particular because of particles of grease and/or metal that may escape prior cleaning of the circuit), together with the dangers inherent to having high pressure connections (dangers of breakage, snagging, or even of a tube being pulled off).

This danger is particularly serious for a supply of oxygen gas on board an aircraft, since in addition to the above-mentioned risks, including a fire in the hold of the aircraft where the tanks are located, such a failure can empty the tanks and reduce the available supply of oxygen gas to nil (the tanks are naturally not designed to be refilled in flight).

In addition, the measurements are highly inaccurate, as explained above, since they take account only of the pressure of the gas in the tanks. For a supply on board an aircraft, the pilot has difficulty in establishing the real content oxygen available in the gas tanks before take-off, and this means that it is necessary to provide a very wide safety margin.

In practice, if more accurate determination of the content in the tanks is desired, then tables are used to correct the measurements performed by taking account of the coefficient of compressibility and of the temperature of the gas (when known): nevertheless, this procedure is onerous and error-prone.

Attempts have been made to remedy some of the above drawbacks by modifying the design of the system, in particular to avoid the presence of a high pressure circuit.

The modified design consists in fitting each tank with its own pressure regulator, together with a pressure sensor and an associated readout.

The advantage then lies in the connections with the common duct being made downstream from the pressure regulators so that the utilization circuit no longer includes a high pressure portion.

However, processing is increased and reading made more complicated. It becomes necessary to sum the contents of the various tanks in order to obtain the total content, which constitutes a more complex operation, and which further degrades accuracy since the individual content measurements already contain a high degree of error (in other words, this system merely reproduces the above-described system, but on a per tank basis).

Further, bulk is necessarily increased and this constitutes a significant disadvantage in relation to a supply of oxygen gas on board an aircraft.

An object of the invention is to provide gauging apparatus that avoids the above-mentioned drawbacks, in particular enabling the high pressure network to be limited or even eliminated and also making it possible to determine the overall content available in the tanks both accurately and quickly.

Another object of the invention is to provide gauging apparatus making it easy to provide a direct indication of overall available capacity in liters NTPD, and also making it possible to display other data, such as the contents available in each individual tank, without the need to refer to correction tables.

SUMMARY OF THE INVENTION

The present invention provides an apparatus for gauging high pressure gas in particular for the supply of oxygen gas on board an aircraft, the apparatus being associated with a gas tank or with a plurality of gas tanks having their outlets interconnected, wherein each individual tank is provided both with a pressure regulator connected to a common outlet duct, and with a pressure sensor producing a signal proportional to the pressure in the, or each, tank, with the, or each, pressure sensor being connected to a calculation and storage unit suitable for determining the content of each tank on the basis of the signal associated therewith and the coefficient of compressibility of the gas contained in each individual tank on the basis of data stored in said unit for different values of pressure, and consequently deducing the overall available content, said calculation unit further including a readout for displaying said overall available content.

In an advantageous embodiment, the apparatus further includes a temperature sensor connected to the calculation and storage unit and producing a signal proportional to the temperature in the vicinity of the, or each, tank, the coefficient of compressibility of the gas being taken into account on the basis of data stored in said unit for different values of pressure and temperature. For a supply of oxygen gas on board an aircraft, the temperature sensed will be the temperature inside the hold containing the oxygen tanks.

More particularly, in order to further improve the account taken of the temperature parameter, a temperature sensor is associated with each tank such that the coefficient of compressibility is taken into account for each individual tank on the basis of data stored for different values of pressure and temperature.

In this case, provision may be made for at least one of the temperature sensors to be mounted in the pressure regulator associated with the corresponding tank, thereby ensuring that the signal provided corresponds exactly to the temperature of the gas in the tank; in a variant, at least one of the temperature sensors is mounted against the side wall of the corresponding tank, which although a little less accurate than the preceding arrangement nevertheless remains highly acceptable when the system has stabilized.

It may also be advantageous, in particular when using tanks of different sizes, to provide apparatus in which the water volume of each tank is also stored in the calculation of storage unit, for the purpose of being taken into account when determining the content of each individual tank.

Also advantageously, values for the unusable residual content of each tank are also stored in the calculation and storage unit, thereby making it possible to display the available content in each individual tank. This is particularly applicable to system maintenance since it is then easy to identify the overall available content in the tanks.

Preferably, the calculation and storage unit includes a three dimensional transcoding array having dimensions associated with pressure, with temperature, and with water volume of each individual tank, and providing an output value which is the gas content of each individual tank.

In this case, the temperature signal applied to the calculation and storage unit including a transcoding array comes from a single temperature sensor disposed in the vicinity of the, or each, tank, or comes from a temperature sensor associated with each tank and mounted in the corresponding pressure regulator, or else comes from a temperature sensor associated with each tank and mounted against the outside wall of said tank.

Finally, the readout for displaying the overall available content is advantageously capable of being read directly in liters NTPD (i.e. liters of dry gas under standard conditions of temperature and pressure).

BRIEF DESCRIPTION OF THE DRAWINGS

Embodiments of the invention are described by way of example with reference to the accompanying drawings, in which:

FIGS. 1 and 2 are diagrams showing two prior art designs for use with a plurality of tanks and described above;

FIG. 3 is a diagram showing apparatus in accordance with the invention, associated in this case with three tanks and including a calculation and storage unit represented by a computer block receiving signals from pressure sensors associated with each tank and with a temperature sensor, and including a table in memory forming a part of a transcoding array; and FIGS. 4 and 5 show two variants of the FIG. 3 apparatus in which provision is made to sense the temperature associated with each tank either by having a sensor mounted in the pressure regulator of each tank or else by having a sensor mounted against the outside wall thereof.

DETAILED DESCRIPTION

FIG. 1 shows a prior art design of a gauging apparatus associated with three gas tanks whose outlets are interconnected.

The figure thus shows apparatus 10 with three tanks $R_1$, $R_2$, and $R_3$ whose outlets are connected to a common duct 11 which is thus a high pressure duct, leading to a pressure regulator RP downstream from which there is a low pressure utilization circuit 12 (e.g. for feeding the oxygen mask system if the supply of oxygen is on board an aircraft). A single pressure sensor CP, e.g. an electrical sensor, is connected to the common duct 11 and has its own power supply 14 and output 15 leading to a single oxygen content readout, e.g. graduated in liters NTPD.

With apparatus such as the apparatus 10 shown in FIG. 1, in addition to the presence of a high pressure network (duct 11), it can be seen that the overall content is determined on the basis of the gas pressure parameter only, by applying the formula $m = PV/zrT$ on the simplifying assumption that $m = kP$ where $k$ is a predetermined constant.

It is shown above that the overall available content determined in this way is very inaccurate.

FIG. 2 shows a variant of the above apparatus.

In this other prior design, the apparatus 20 is associated with three tanks $R_1$, $R_2$, and $R_3$, each of which is fitted with a respective pressure regulator $RP_1$, $RP_2$, and $RP_3$, and with a respective pressure sensor $CP_1$, $CP_2$, and $CP_3$.

In this case, the outlets 21, 22, and 23 from the pressure regulators are connected to a low pressure duct 24: this avoids the presence of a high pressure network and thus avoids the drawback mentioned above associated with oxygen gas.

Each electrical pressure sensor $CP_1$, $CP_2$, and $CP_3$ has its own power supply 25 and has a respective output 26, 27, or 28 leading to an individual associated content readout $IC_1$, $IC_2$, or $IC_3$.

With an apparatus of this type, a readout is available for the content of each tank, however the readout is inaccurate insofar as pressure is the only parameter taken into account (individual pressures in this case). In addition, it is now necessary to sum the individual contents in order to obtain the overall content, and this considerably complicates processing and further reduces the accuracy of the final result, as explained above.

FIG. 3 shows gauging apparatus 100 in accordance with the invention associated in this case with three tanks $R_1$, $R_2$, and $R_3$ (with the number three merely constituting an example).

In the apparatus 100, each individual tank $R_1$, $R_2$, and $R_3$ is provided firstly with a respective pressure regulator $RP_1$, $RP_2$, or $RP_3$ connected via an associated outlet 101, 102, or 103 with a common outlet duct 104, and secondly with a respective pressure sensor $CP_1$, $CP_2$, or $CP_3$ (e.g. an electrical sensor having a power supply 105) producing a signal proportional to the pressure inside the tank. Thus, like the apparatus of FIG. 2, there is no high pressure network, and as already mentioned above, this is particularly advantageous when the gas is oxygen in a supply on board an aircraft.

However, unlike the apparatus of FIG. 2, the pressure sensors $CP_1$, $CP_2$, and $CP_3$ are connected in this case to a calculation and storage unit 120 suitable for deducing the content of each individual tank while taking into account the coefficient of compressibility of the gas contained in each individual tank on the basis of the associated signal and on the basis of data stored in said unit for different pressures, and consequently for deducing the overall available content, with said circulation unit further including a readout 140 for displaying said overall available content.

The unit 120 comprises, in this case, a block 130 representing a computer and a memory table 150 forming a part of a transcoding array.

Links 111, 112, and 113 connect the computer 130 to each pressure sensor $CP_1$, $CP_2$, and $CP_3$ so that the voltage signals produced by the pressure sensors can be converted into pressures by the computer.

In the most general case, the transcoding array 150 is a three-dimensional array having dimensions associated with pressure, temperature, and water volume for each individual tank, giving an output value which is the gas content of each individual tank taking account of correction coefficients delivered by the computer.

The memory may be organized so as to give gas compressibility coefficients $z_1, z_2, z_3, \ldots, z_i, \ldots$ corresponding to a succession of pressures $P_1, P_2, P_3, \ldots, P_i$ . . . . It is then easy to obtain the coefficient of compressibility associated with each individual tank (when the observed pressure lies between two successive stored pressure values, then the appropriate values are interpolated).

The unit 120 can thus calculate the content $C_j$ of each tank $R_j$ by taking account of the associated values of pressure $P_j$ and coefficient of compressibility $z_j$ using the ratio $P_jV/z_jT$.

The total content C can then easily be deduced by summing the individual contents $C_j$ calculated in this way, and then calculating the overall available content $C_d$ which is equal to $C-C_r$ where $C_r$ represents the unusable content or residue (corresponding to the threshold set by the pressure regulators, e.g. 0.5 MPa), and the readout 140 then displays this measurement directly, preferably expressed in liters NTPD.

However, it is advantageous also to take account of the temperature variation in the coefficient of compressibility of the gas when determining the content of each tank.

As shown in FIG. 3, the acquisition system of the apparatus 100 then further includes a temperature sensor CT connected by a line 106 to the computer 130 of the calculation and storage unit 120, producing a signal proportional to the temperature in the vicinity of the tanks $R_1$, $R_2$, and $R_3$. For a supply of oxygen gas on board an aircraft, the temperature T sensed in this way is the temperature in the hold in which the tanks are located.

The sensor CT may be a resistive sensor (including a platinum probe) or it may be a thermocouple.

The unit 120 can then determine the content of the gas in each individual tank more accurately on the basis of data stored for different pressures and different temperatures. In this case, the transcoding array 150 is a three-dimensional array having dimensions associated with pressure, with the water volume of each individual tank, and with the temperature in the vicinity of the tanks, and giving an output value which is the gas content of each individual tank.

The memory may then be organized more fully, giving values of the coefficient of compressibility of the gas $z_{11}, z_{12}, z \ldots, z_{21}, z_{22}, \ldots$, for successive pressures $P_1$, $P_2, \ldots$ and temperatures $T_1, T_2, \ldots$.

The above-described calculation for each tank $R_j$ then includes the step of obtaining a corresponding value $z_j$ which is interpolated from the values of z stored for values of temperature and pressure which are the closest to those sensed by the corresponding sensors.

The procedure for determining the overall available content is then identical to the procedure described above, except insofar as the temperature T as used in the expression $P_jV/z_jT$ is now the actual temperature as detected by the sensor CT in the vicinity of the tanks.

The measurement is then considerably more accurate, particularly if the temperature is liable to vary over a wide range, as is the case for a supply of oxygen gas on board an aircraft (the normal temperature range being 258° K. to 328° K.).

Naturally, temperature measurement can be improved by providing a more accurate measurement in association with each individual tank, as shown in FIGS. 4 and 5.

In this case, a temperature sensor $CT_1$, $CT_2$, and $CT_3$ is associated with each tank $R_1$, $R_2$, and $R_3$ so that the content is determined for each individual tank on the basis of individually applicable stored values of pressure and temperature.

In the apparatus 200 shown in FIG. 4 (where items identical to those shown in FIG. 3 are given the same references plus one hundred), at least one of the temperature sensors (in this case three temperature sensors $CT_1$, $CT_2$, and $CT_3$) is mounted in the pressure regulator associated with the tank in question so that the signal it delivers corresponds exactly to the temperature of the gas in the tank. Each temperature sensor $CT_1$, $CT_2$, and $CT_3$ is connected via a respective line 207, 208, and 209 to the computer 230 of the calculation and storage unit 220 which includes the transcoding array 250.

In the apparatus 300 shown in FIG. 5 (where items that are identical to those of the apparatus shown in FIG. 3 are given the same references plus two hundred), at least one of the temperature sensors (in this case all three sensors $CT_1$, CT2, and CT3) is mounted directly against the outside wall of the corresponding tank. Naturally there are link lines 307, 308, 309 leading to the computer 330 of the calculator and storage unit 320 which includes a transcoding array 350. This apparatus is naturally slightly less accurate than the preceding apparatus, but it is often satisfactory when the system is stabilized.

The memory of the units 220 and 320 in the apparatuses 200 and 300 may be organized in the same way as described above with reference to FIG. 3 for the apparatus 100, except insofar as the temperatures $T_j$ used to access the array are associated with individual ones of the tanks (instead of using a common value T for all of them), with the measured content each tank thus taking into account an individual coefficient of compressibility $z_j$.

Thus, in the example shown in FIG. 5, the calculation and storage unit 350 has a three-dimensional transcoding array 350 with dimensions associated with pressure, water volume for each individual tank, and temperature in the immediate vicinity of each tank, with the output values being gas contents. Similarly, in the example shown in FIG. 4, the calculation and storage unit 220 has a three-dimensional transcoding array 250 where the dimensions correspond to pressure, water volume, and temperature in each individual tank, and where each output value is a gas content.

Alternatively the units 220 and 230 may calculate the content $C_j$ of each tank $R_j$ by taking account of the associated values of pressure $P_j$, $T_j$, to obtain an explicit coefficient of compressibility $z_j$, and then using the ratio $P_jV/z_jT_j$.

The total content C can then be deduced by summing the individual contents $C_j$ and then by determining the overall available content $C_d=C-C_r$, with the readouts 240 or 340 then giving a direct reading of said measurement, preferably expressed in liters NTPD.

Naturally, it is possible to make use of the volume of each tank when determining the individual contents, i.e. the water volume which corresponds to the tank being filled at atmospheric pressure.

A simple way of proceeding consists merely in storing the water volumes $V_1$, $V_2$, ... of each tank, as shown in the additional portion of the table in FIG. 3.

It is also possible to further improve the process by calculating the real volume of each tank at the associated internal pressure (to take account of tank expansion) on the basis of a program determined in advance.

In this case, the content $C_j$ of each tank $R_j$ may be calculated by taking account of the associated pressure $P_j$, temperature $T_j$, volume $V_j$, and coefficient of compressibility $z_j$ using the ratio $P_jV_j/z_jT_j$.

The overall content C, and finally the overall available content $C_d$ are then obtained in the same way as before.

Finally, it is also possible to use the calculation and storage unit for obtaining other information: for example, the values of unusable residual content $C_{rj}$ can be stored so as to make it easy to display the available content $C_{dj}$ of each individual tank $R_j$ using the expression $C_{dj}=C_j-C_{rj}$.

This may be advantageous in system maintenance since it is then easy to identify quickly and accurately the percentage to which each tank is, in fact, full.

Naturally, the above description is easily applied to the special case of having a single tank, the tank $R_1$. In that case there is only one pressure regulator $RP_1$, one pressure sensor $CP_1$, and one temperature CT (FIG. 3), or $CT_1$, which may be mounted either inside the pressure regulator $RP_1$ (FIG. 4) or else against the outside wall of the tank $R_1$ (FIG. 5).

Finally, the apparatus of the invention constitutes highly advantageous equipment, particularly when associated with a supply of oxygen gas on board an aircraft. At any moment the pilot can obtain an accurate and direct reading of the overall available content, in particular when establishing a flight plan, and may also obtain additional information concerning each tank, if so desired.

The invention is not limited to the embodiment described above, but on the contrary covers any variant using means equivalent to the essential characteristics that appear in the claims.

We claim:

1. Apparatus for supplying gaseous oxygen on board an aircraft, the apparatus comprising a plurality of gas tanks having their outlets interconnected, wherein each individual tank is provided both with a pressure regulator connected to a common low pressure outlet duct, and with a pressure sensor producing a signal proportional to the pressure in each individual tank, with each pressure sensor being connected to a calculation and storage unit suitable for determining the content of each individual tank on the basis of the signal associated therewith and taking account of the coefficient of compressibility of the oxygen contained in each individual tank on the basis of data stored in said calculation and storage unit for different values of pressure, and consequently deducing the overall available content, said calculation and storage unit further including a readout for displaying said overall available content.

2. Apparatus according to claim 1, further including a temperature sensor connected to the calculation and storage unit and producing a signal proportional to the temperature in the vicinity of each tank, the coefficient of compressibility of the oxygen being taken into account on the basis of data stored in said unit for different values of pressure and temperature.

3. Apparatus according to claim 2, wherein a temperature sensor is associated with each tank such that the coefficient of compressibility is taken into account for each individual tank on the basis of values stored for different data of pressure and temperature.

4. Apparatus according to claim 3, wherein the temperature sensors are mounted in the pressure regulator associated with the corresponding tank, thereby ensuring that the signal provided corresponds exactly to the temperature of the oxygen in the corresponding tank.

5. Apparatus according to claim 4, wherein the calculation and storage unit includes a three-dimensional transcoding array having dimensions associated with pressure, with temperature, and with water volume of each individual tank, and providing an output value which is the oxygen content of each individual tank, and wherein the temperature signal applied to the calculation and storage unit including a transcoding table comes from a temperature sensor associated with each individual tank and mounted in the corresponding pressure regulator.

6. Apparatus according to claim 3, wherein the temperature sensors are mounted against the side wall of the corresponding tank.

7. Apparatus according to claim 6, wherein the calculation and storage unit includes a three-dimensional transcoding array having dimensions associated with pressure, with temperature, and with water volume of each individual tank, and providing an output value which is the oxygen content of each individual tank, and wherein the temperature signal applied to the calculation and storage unit including a transcoding table comes from a temperature sensor associated with each individual tank and mounted against the outside wall of each individual tank.

8. Apparatus according to claim 2, wherein the calculation and storage unit includes a three-dimensional transcoding array having dimensions associated with pressure, with temperature, and with water volume of each individual tank, and providing an output value which is the oxygen content of each individual tank, and wherein the temperature signal applied to the calculation and storage unit including a transcoding array comes from a single temperature sensor disposed in the vicinity of the individual tanks.

9. Apparatus according to claim 1, wherein the water volume of each individual tank is also stored in the calculation and storage unit, for the purpose of being taken into account when determining the content of each individual tank.

10. Apparatus according to claim 1, wherein values for the unusable residual content of each tank are also stored in the calculation and storage unit, thereby making it possible to display the available content in each individual tank.

11. Apparatus according to claim 1, wherein the calculation and storage unit includes a three-dimensional transcoding array having dimensions associated with pressure, with temperature, and with water volume of each individual tank, and providing an output value which is the oxygen content of each individual tank.

12. Apparatus according of claim 1, wherein the readout displaying the overall available content is capable of providing a direct readout in liters NTPD.

13. Apparatus for gauging high pressure gas in particular for the supply of oxygen gas on board an aircraft, the apparatus being associated with a gas tank or with a plurality of gas tanks having their outlets interconnected, wherein each individual tank is provided both with a pressure regulator connected to a common outlet duct, and with a pressure sensor producing a signal proportional to the pressure in the, or each, tank, with the or each, pressure sensor being connected to a calculation and storage unit suitable for determining the content of each individual tank on the basis of the signal associated therewith and taking account of the coefficient of compressibility of the gas contained in each individual tank on the basis of data stored in said calculation and storage unit for different values of pressure, and consequently deducing the overall available content, said calculation and storage unit further including a readout for displaying said overall available content, and wherein the water volume of each individual tank is also stored in the calculation and storage unit, for the purpose of being taken into account when determining the content of each individual tank.

14. Apparatus for gauging high pressure gas in particular for the supply of oxygen gas on board an aircraft, the apparatus being associated with a gas tank or with a plurality of gas tanks having their outlets interconnected, wherein each individual tank is provided both with a pressure regulator connected to a common outlet duct, and with a pressure sensor producing a signal proportional to the pressure in the, or each, individual tank, with the or each, pressure sensor being connected to a calculation and storage unit suitable for determining the content of each individual tank on the basis of the signal associated therewith and taking account of the coefficient of compressibility of the gas contained in each individual tank on the basis of data stored in said calculation and storage unit for different values of pressure, and consequently deducing the overall available content, said calculation and storage unit further including a readout for displaying said overall available content;

further including a temperature sensor connected to the calculation and storage unit and producing a signal proportional to the temperature in the vicinity of the, or each individual tank, the coefficient of compressibility of the gas being taken into account on the basis of data stored in said calculation and storage unit for different values of pressure and temperature, and wherein the calculation and storage unit includes a three-dimensional transcoding array having dimensions associated with pressure, with temperature, and with water volume of each individual tank, and providing an output value which is the gas content of each individual tank, and wherein the temperature signal applied to the calculation and storage unit including a transcoding array comes from a single temperature sensor disposed in the vicinity of the, or each, individual tank.

* * * * *

UNITED STATES PATENT AND TRADEMARK OFFICE
CERTIFICATE OF CORRECTION

PATENT NO.    :   5,159,839
DATED         :   November 3, 1992
INVENTOR(S)   :   Gérard Silber and Gilles Renner It is certified that error appears in the above-identified patent and that said Letters Patent is hereby corrected as shown below:

On the title page, under item [73] Assignee: change "Societe de Fabricaiton d'Instruments de Mesure" to --Société de Fabrication d'Instruments de Mesure--.

Signed and Sealed this

Twenty-fifth Day of June, 1996

*Attest:*

BRUCE LEHMAN

*Attesting Officer*   Commissioner of Patents and Trademarks